US012639525B2

(12) United States Patent
Raimondo et al.

(10) Patent No.: US 12,639,525 B2
(45) Date of Patent: May 26, 2026

(54) PROMPTING LANGUAGE MODELS WITH WORKFLOW PLANS

(71) Applicant: ServiceNow, Inc., Santa Clara, CA (US)

(72) Inventors: Stefania Evelina Raimondo, Toronto (CA); Christopher Joseph Pal, Montreal (CA); Hector Luis Palacios Verdes, Montreal (CA); David María Vázquez Bermúdez, Montreal (CA); Xiaotian Liu, Toronto (CA)

(73) Assignee: ServiceNow, Inc.

( * ) Notice: Subject to any disclaimer, the term of this patent is extended or adjusted under 35 U.S.C. 154(b) by 327 days.

(21) Appl. No.: 18/072,479

(22) Filed: Nov. 30, 2022

(65) Prior Publication Data

US 2024/0176958 A1     May 30, 2024

(51) Int. Cl.
| | |
|---|---|
| *G06F 17/00* | (2019.01) |
| *G06F 40/40* | (2020.01) |
| *G06N 3/006* | (2023.01) |
| *G06N 3/0455* | (2023.01) |

(52) U.S. Cl.
CPC ............. *G06F 40/40* (2020.01); *G06N 3/006* (2013.01); *G06N 3/0455* (2023.01)

(58) Field of Classification Search
CPC ....... G06F 40/40; G06N 3/0455; G06N 3/006
USPC ............................................................ 704/9
See application file for complete search history.

(56) References Cited

U.S. PATENT DOCUMENTS

| | | | |
|---|---|---|---|
| 10,673,787 | B2 | 6/2020 | Koohmarey |
| 10,685,359 | B2 | 6/2020 | Walthers |
| 11,054,972 | B2 | 7/2021 | Yaseen |
| 11,551,171 | B2 | 1/2023 | Rafferty |
| 11,574,131 | B2 | 2/2023 | Shazeer |
| 11,843,526 | B2 | 12/2023 | Swvigaradoss |
| 12,254,014 | B1 | 3/2025 | El Hattami |

(Continued)

FOREIGN PATENT DOCUMENTS

| | | |
|---|---|---|
| CN | 117234480 B | 1/2024 |
| CN | 118210489 A | 6/2024 |

OTHER PUBLICATIONS

Lu_Neuro-Symbolic Procedural Planning With Commonsense PROMPTING_9_22_25 (Year: Sep. 2022) (Year: 2022).*

(Continued)

*Primary Examiner* — Paul C Mccord
(74) *Attorney, Agent, or Firm* — Mcdonnell Boehnen Hulbert & Berghoff LLP

(57) ABSTRACT

A pre-trained natural language processing machine learning model is received. The pre-trained natural language processing machine learning model is tuned. A workflow to be implemented by a chatbot to complete a task-oriented dialog is received. A representation of one or more plan steps based on a current progression state of the workflow is dynamically determined. At least the representation of the one or more plan steps is provided as an input to the pre-trained natural language processing machine learning model to guide the pre-trained natural language processing machine learning model. An output action and/or an utterance for the task-oriented dialog is received from the pre-trained natural language processing machine learning model.

20 Claims, 6 Drawing Sheets

(56)            References Cited

U.S. PATENT DOCUMENTS

| | | | |
|---|---|---|---|
| 2012/0041903 A1* | 2/2012 | Beilby | H04L 51/02 |
| | | | 706/11 |
| 2016/0188298 A1 | 6/2016 | Vandikas | |
| 2019/0347363 A1* | 11/2019 | Kishimoto | G06F 16/90332 |
| 2021/0192397 A1* | 6/2021 | Rastogi | G06Q 10/02 |
| 2021/0342124 A1 | 11/2021 | Cote | |
| 2022/0067292 A1* | 3/2022 | Rastogi | G06F 40/30 |
| 2022/0139384 A1* | 5/2022 | Wu | G06F 40/35 |
| | | | 704/257 |
| 2022/0350733 A1* | 11/2022 | Vasavan | G06F 11/3692 |
| 2023/0037683 A1 | 2/2023 | Cui et al. | |
| 2023/0040995 A1 | 2/2023 | Golani et al. | |
| 2023/0280983 A1 | 9/2023 | Zang | |
| 2023/0376838 A1 | 11/2023 | El Hattami | |
| 2023/0385026 A1 | 11/2023 | El Hattami | |
| 2023/0409838 A1 | 12/2023 | Chakraborti | |
| 2023/0409956 A1 | 12/2023 | El Hattami | |
| 2024/0017695 A1 | 1/2024 | Shiota et al. | |
| 2024/0176958 A1 | 5/2024 | Raimondo | |
| 2024/0378391 A1 | 11/2024 | Bradley | |
| 2025/0026552 A1 | 1/2025 | Merzeau et al. | |
| 2025/0028759 A1 | 1/2025 | Castillo | |
| 2025/0037052 A1 | 1/2025 | Chen | |

OTHER PUBLICATIONS

Collins_Structured, flexible, and robust: benchmarking and improving large language models towards more human-like behavior in out-of-distribution reasoning tasks_5_11_22 (Year: May 2022) (Year: 2022).*

International Search Report and Written Opinion, PCT Application PCT/US2025/038035, mailed Jul. 17, 2025.

* cited by examiner

202

Start

Determine context data items ⌐502

Augment context ⌐504

End

PROMPTING LANGUAGE MODELS WITH WORKFLOW PLANS

BACKGROUND OF THE INVENTION

Text-based dialogues are widely used to solve real-world problems. In some scenarios, text-based dialogues are generated between a user and a dialogue system. Examples of such a dialogue system are interactive conversational agents, virtual agents, chatbots, and so forth. The content of text-based dialogues is wide-ranging and can cover technical support services, customer support, entertainment, or other topics. Text-based dialogues can be long and/or complex. Thus, there is a need to direct dialogues toward solving specific problems.

BRIEF DESCRIPTION OF THE DRAWINGS

Various embodiments of the invention are disclosed in the following detailed description and the accompanying drawings.

DETAILED DESCRIPTION

Figure 1:
FIG. 1 is a block diagram illustrating an embodiment of a system for handling a task-oriented dialog.
Figure 1:
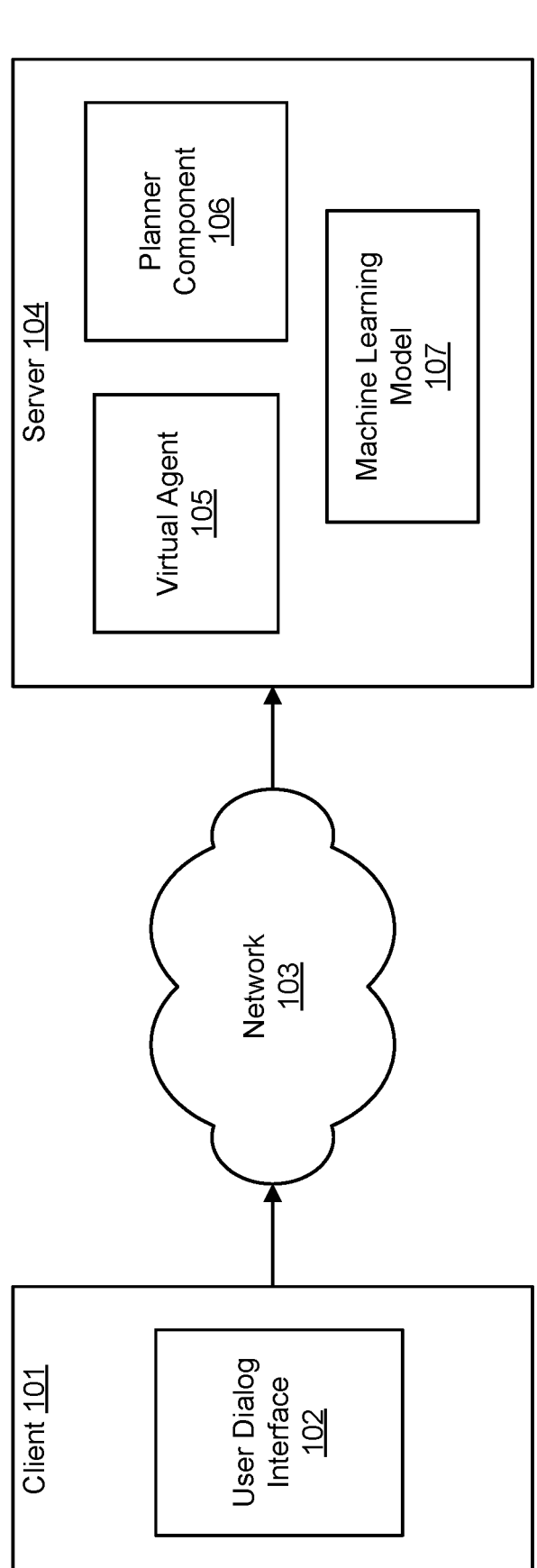

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications, and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A special type of prompting for language models based on workflow plans is disclosed. A natural language processing machine learning model that may have been pre-trained on other tasks (such as simple language modelling or other tasks) may serve as the starting point for learning. The pre-trained natural language processing machine learning model may then be fine-tuned to task-oriented dialogues. A workflow to be implemented by a chatbot to complete a task-oriented dialog is received. A representation of one or more plan steps based on a current progression state of the workflow is dynamically determined using an external planning mechanism (e.g., based on a symbolic planning technique, or other module specialized for planning). At minimum, a representation of the one or more plan steps is provided as an input to the pre-trained natural language processing machine learning model to guide the model. However, additional metadata and information about workflow structure can also be provided. This information may comprise constraints and requirements, including for example, required and optional arguments or inputs at each workflow step, workflow step ordering and precondition information. The model produces an output for the task-oriented dialog, where the output could be an action, an utterance, the intent of the user, or prediction of the state of the dialogue. In some embodiments, the input to the natural language processing machine learning model includes a full short example of how the model interacts with the customer.

Task-oriented dialogue is difficult in part because it involves understanding user intents, collecting missing information from the user, correctly executing sequences of application programming interface (API) calls, and generating helpful and fluent responses. A dialogue (also referred to herein as dialog) refers to a conversation between two or more parties. In various embodiments, dialogue agents are constructed using transformer language models in a text2text paradigm. Prior approaches that create dialogue agents based on large language models provided only with conversation history as input do not reliably perform new multi-step tasks that are unseen during training. To address these limitations, the techniques disclosed herein augment dialogue contexts with prompts comprising known workflows. Once an appropriate workflow has been identified, it is possible to inject workflow plans as prompts comprised of action sequences required to accomplish a task, possibly augmented with additional metadata. In such a framework, it is possible to obtain workflow prompts from a symbolic planning mechanism or other types of external API calls. This allows new workflows to be added and intermediate steps to be changed and reassembled with guarantees that a correct and up-to-date plan is provided. A plan is up-to-date based on the state of the conversation, and in the information available about the user and the system. In some embodiments, the Action-Based Conversations Dataset (ABCD) is utilized at least in part to train text2text (e.g., T5) based language models. Technological advantages of the trained models disclosed herein include these models being: a) able to generalize to unseen workflows by following the provided plan, and b) able to generalize to unseen actions if they are provided in the plan. In contrast, models which are provided no workflow information or only the workflow name deteriorate on tasks involving new multi-step plans.

Task-oriented dialogues allow service agents (e.g., virtual agents with at least the functionality of chatbots) and users to accomplish complex tasks flexibly and naturally. However, such dialogues are challenging for completely virtual agents (also referred to herein as automated agents, agents, etc.) because success requires the tracking of long-range information and correct behavior at every step of multi-step tasks. In service-focused task-oriented dialogue, an agent and a user interact back-and-forth freely with natural language text to reach a goal determined by the user. The agent must identify the task the user intends to solve, collect relevant information from the user, and execute actions until the task is complete. The possible set of actions and the order in which actions are accomplished depends on the specific task environment, the user personal information in the system database, and on the state of the system such as service availability.

Modern large language models can be applied to complex structured reasoning tasks including task-oriented dialogue. By leveraging large-scale pretraining, these models can generate more fluent text and better interpret natural language. However, pure language model solutions cannot reliably solve complex collaborative tasks, especially when presented with novel goals or types of information, or when the steps required must satisfy external constraints like business rules. On the other hand, symbolic reasoning methods excel at inferring logically consistent conclusions from facts and rules, which can be chained together to form provably correct plans. Symbolic methods offer the possibility of dynamically providing valid plans to achieve goals which are achieved through behaviors that involve interacting with users and API calls. The techniques disclosed herein describe ways in which user interactions and API calls can form the basic elements of control, which are potentially also created dynamically, generating the equivalent of a personalized plan for a dialogue tree realizable in the current state of the system.

Performance on task-oriented dialogue can be improved by augmenting language models with explicit information drawn from a symbolic planner. In some embodiments, a T5 text2text model is fine-tuned on the tasks in the ABCD dataset, augmenting the dialogue context provided to the model with an explicit plan describing the required action sequence necessary to correctly execute the required flow and solve the user's problem. As used herein, text2text refers to a machine learning model that converts input text to output text. A text2text setup is flexible, in that new information can be provided to the model at test time to describe the required outputs, as opposed to relying on, for example, training a separate classification layer for every new task. A large language model can leverage planning for better performing task-oriented dialogues. The text2text model is able to generalize to new flows/tasks and execute actions not seen during training with just having access to the plan for these new tasks. In some embodiments, the model(s) described herein are based on a T5 text2text model which interacts with a symbolic planner that serves as a form of prompt plan conditioning. In various embodiments, the preconditions and effects are used to dynamically generate sequences of actions called plans. In various embodiments, symbolic plans are used only as conditioning for a large neural language model which in turn produces utterances and actions to be executed. In various embodiments, the symbolic plans are used to restrict or constraint the actions that the language model can execute. In various embodiments, pre-computed plans are utilized. It is also possible for plans to be dynamically determined on-the-fly. In various embodiments, the actions can have preconditions that depend on the user context, information in a database, or the status of software systems, so the plans are adapted on-the-fly to a concrete situation.

A dialogue D is comprised of ordered turns $t_1$: D $t_1$, . . . $t_T$ where T is the total number of turns. Turns have an associated speaker $s_t$, which may be either the agent $S_A$ or the user $S_U$; $s \in \{A, U\}$. Turns are also comprised of an utterance $u_t$ which is a natural language string and an action at, either of which may be null. As described herein, it is only required that one of the utterance or action is non-null, but this is not required in general. Thus, a turn is described by $t_t = (s_t, u_t, a_t)$. It is assumed that the agent wants to identify the tasks the user intends to have solved, and knowing that would allow for the choosing of the appropriate sequence of actions. Formally, the agent can accomplish the task corresponding to the user intent by executing an ordered set of actions $a_1$, . . . , $a_k$, with k<T. The actions can use slots or arguments comprised of information extracted during the dialogue, available in a database, or produced by another action. A task or goal is considered completed if the complete set of workflow actions is executed in the correct order with correct arguments. However, an action might fail to execute due to missing slots or other reasons. Moreover, not all the possible sequences of actions are convenient for solving the user's task. Some sequences might be illegal according to business rules, while others might be inconvenient. As used herein, business rules refer to specific instructions or constraints associated with actions and information in the systems or collected during the dialogue.

An action theory is a tuple $\Pi = (P, O)$, where P is a set of fluent or proposition symbols, and O is a set of operators or actions. F is the set of possible facts, where a fact is an assignment of fluent p in P to true or false. As used herein, facts are used to describe real or hypothetical context or states. A subset of facts from F is consistent when it has no fluent assigned to both true and false. Every operator $O \in Q$ is associated with its preconditions $pre(O) \subseteq F$, and its effect $eff(O) \subseteq F$. Both pre(O) and eff(0) are assumed to be consistent. A state $s \subseteq F$ is a set of assignments of the fluents P, such that all the fluents in P are assigned in s. An action a is applicable in a state s if $pre(a) \subseteq s$. The resulting state of applying an applicable action a in a state s is the state f(s, a) $(s \backslash neff(a)) \cup eff(a)$, where neff(O) assigns to each fact in eff(O) its opposite value. An action theory with an initial state and set of possible goal states is known as a Stanford Research Institute Problem Solver (STRIPS) planning problem or task. A solution to such a problem is a plan or sequence of actions that is guaranteed to achieve the goal. Planners receive new STRIPS problems and attempt to return plans without requiring any training. In principle, a STRIPS problem might have no plan, or it might be hard to obtain as STRIPS plan existence is NP-hard. However, in practice, state-of-the-art planners can obtain plans readily. It is possible to encode STRIPS problems using a Planning Domain Definition Language (PDDL) and obtain plans by executing the planner. PDDL allows for the definition of STRIPS problems in a more compact way by using objects. The facts and actions are all possible instantiations of predicates and actions schemas over a fixed set of objects. In various embodiments, the plans could be obtained by other symbolic reasoning tools like theorem provers, SMT solvers, SAT solvers, constraint optimization or satisfaction solvers, Hierarchical Task Network (HTN) planning, model checking tools using logics like LTL, and others; the plans might also come from a software artifact that produces or retrieves previous plans. In various embodiments, STRIPS is extended to consider that effect of an operator O is eff(O)

=<$e_1$, . . . , $e_k$>, where each $e_i \subseteq F^k$, expressing one of the possible effects of execution of the operator O, and each operator has a different k, and k is at least 1. In this embodiment, the plan is not a sequence of actions but a rooted direct graph so that each path corresponds to sequence of actions achieving the goal for a possible effect of the actions. In this embodiment, the planning problem is called Full Observable Non-Deterministic planning (FOND). In this embodiment, the subgraph of future executions can be expressed as a sequence for conditioning the model, or it can be used to restrict the possible actions that the language model can execute.

In various embodiments, propositions P are associated with the slots of a dialogue state. If a proposition is true in state s, it means a slot is available in the dialogue state. For an action a, the precondition pre(a) expresses what slots must be available in the state and what must not be available. The effect eff(a) expresses the changes in the slots available. An action theory allows for the description of possible behaviors or paths in a dialogue system, including business rules. For convenience, actions can be described as functions, and their preconditions can be associated with a fixed number of arguments per action:

$$a_t = \alpha^\alpha(\alpha_1^s, \alpha_2^s, \ldots, \alpha_K^s).$$

This enables simple slot-filling setups, with functions being the intents and arguments being the slots. It is possible to express more complex dialogues. Given an initial state describing what slots are already available in the context, and the goal of achieving a user intent, an action theory Π describing how actions depend on and affect slots, it is possible to formulate a STRIPS planning problem. The set of all possible plans corresponds to the set of all dialogue paths possible from the initial state up to the goal. Each path describes the actions and the changes to the dialogue state. New constraints, rules and tasks can be added to the planning mechanism in other symbolic languages different from STRIPS like Linear Temporal Logic (LTL) or constraints as used in combinatorial optimization. The resulting plans will have new actions and sequences of actions. Since the planner is symbolic, there are no errors in such plans with respect to the action theory. Large language models (LLMs) conditioned on plans unseen during training are able to better adapt to performing new tasks in a zero-shot learning setting. In some embodiments, the plans might include some errors because the assumption preconditions and effects of the actions are not true, but the LLM might still benefit from conditioning on such plans.

FIG. 1 is a block diagram illustrating an embodiment of a system for handling a task-oriented dialog. In the example shown, system 100 includes client 101, user dialog interface 102, network 103, server 104, virtual agent 105, planner component 106, and machine learning model 107. In some embodiments, client 101 is a computer or other hardware device that a user (e.g., a human) utilizes to engage in a dialog with a virtual agent. In the example illustrated, user dialog interface 102 resides on client 101. In some embodiments, user dialog interface 102 includes components for the user to input text, wherein the text is comprised of natural language strings.

In the example illustrated, client 101 is communicatively connected to network 103. Text inputted by a user can be transmitted to server 104 using network 103. Examples of network 103 include one or more of the following: a direct or indirect physical communication connection, mobile communication network, Internet, intranet, Local Area Network, Wide Area Network, Storage Area Network, and any other form of connecting two or more systems, components, or storage devices together. In various embodiments, server 104 is a computer or other hardware component that provides task-oriented dialogue functionality. In the example illustrated, virtual agent 105 resides on server 104. In some embodiments, virtual agent 105 receives text from a user and transmits text back to the user. Virtual agent 105 may include a hardware storage component (e.g., a hard drive for message storage).

In the example illustrated, planner component 106 resides on server 104. In various embodiments, planner component 106 provides prompting information to machine learning model 107 that is useful for guiding machine learning model 107. For example, planner component may provide workflow names and action plans. Further details regarding example plans are described herein. In various embodiments, machine learning model is a pre-trained natural language processing machine learning model. In some embodiments, machine learning model 107 is a text2text model, such as an encoder-decoder T5 model. In various embodiments, machine learning model 107 is tuned (e.g., fine-tuned) with plans. For example, a T5 text2text model may be fine-tuned on the multi-step tasks of the ABCD dataset, augmenting the dialogue context provided to machine learning model 107 with explicit plans describing the required remaining action sequence necessary to correctly execute the required workflow and solve the user's problem. In various embodiments, client 101 and/or server 104 are programmed computer systems.

In the example shown, portions of the communication path between the components are shown. Other communication paths may exist, and the example of FIG. 1 has been simplified to illustrate the example clearly. Although single instances of components have been shown to simplify the diagram, additional instances of any of the components shown in FIG. 1 may exist. The number of components and the connections shown in FIG. 1 are merely illustrative. The components are not necessarily located in the same geographic location. Components not shown in FIG. 1 may also exist.

Figure 2:
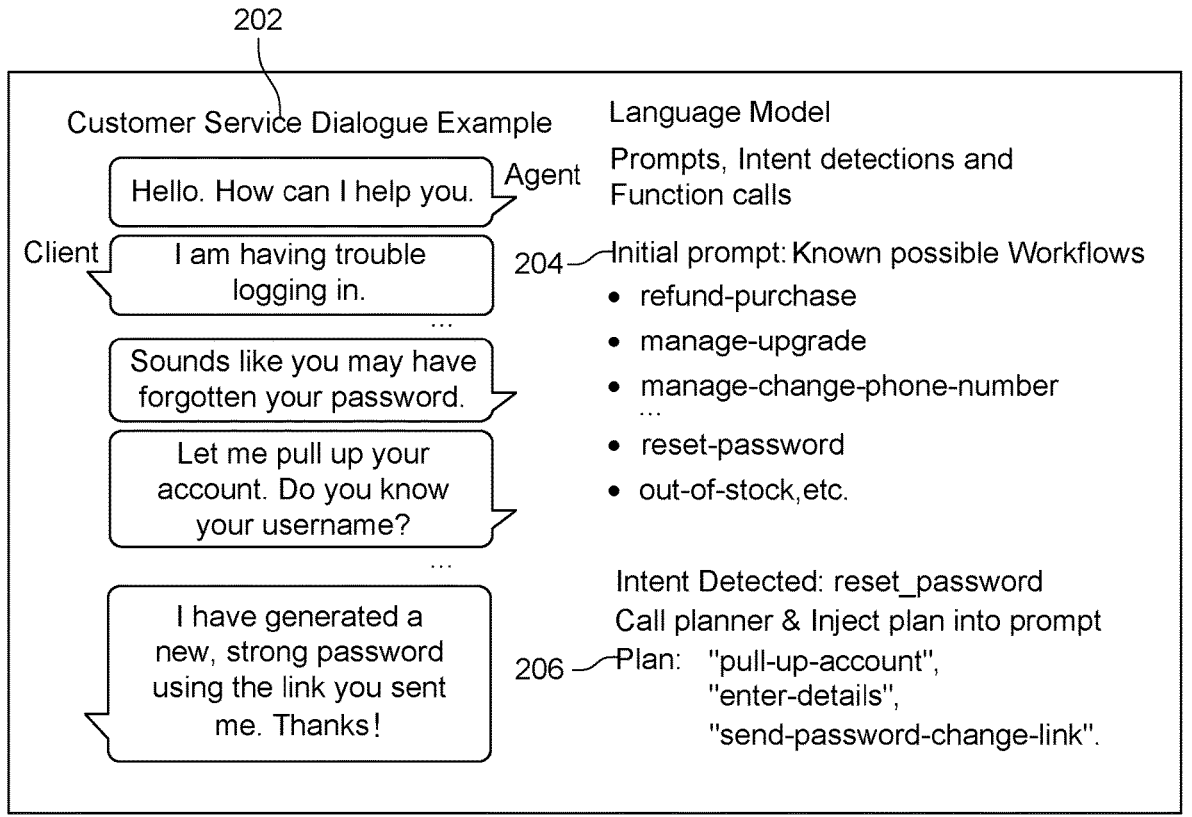
FIG. 2 is a diagram illustrating an example of a task-oriented dialog.

FIG. 2 is a diagram illustrating an example of a task-oriented dialog. In the example shown, dialogue 202 involves a conversation between an agent and client in which the client indicates trouble with logging in and the agent responds with password help. In some embodiments, the client corresponds to client 101 of FIG. 1, and the agent corresponds to virtual agent 105 of FIG. 1. In some embodiments, the text inputs of the client correspond to inputs to machine learning model 107 of FIG. 1, and the text outputs of the agent correspond to outputs of machine learning model 107 of FIG. 1. In the example illustrated, additional prompts provide context that an LLM (e.g., machine learning model 107 of FIG. 1) can utilize. As shown in FIG. 2, initially, the prompts are a list of valid workflows 204, including "refund-purchase", "manage-upgrade", "manage-change-phone-number", . . . , "reset-password", etc. In the example illustrated, when the user intent is detected, which is "reset-password" from the list of valid workflows, a planner (e.g., planner component 106 of FIG. 1) is called to provide the LLM with plan 206, which helps guide the dialog. This approach permits new workflow steps to be added on the fly and dynamically restructured workflows to be used to guide task-oriented dialogues. In the example shown, plan 206 is comprised of the actions "pull-up-account", "enter-details", and "send-password-change-link".

Figure 3:
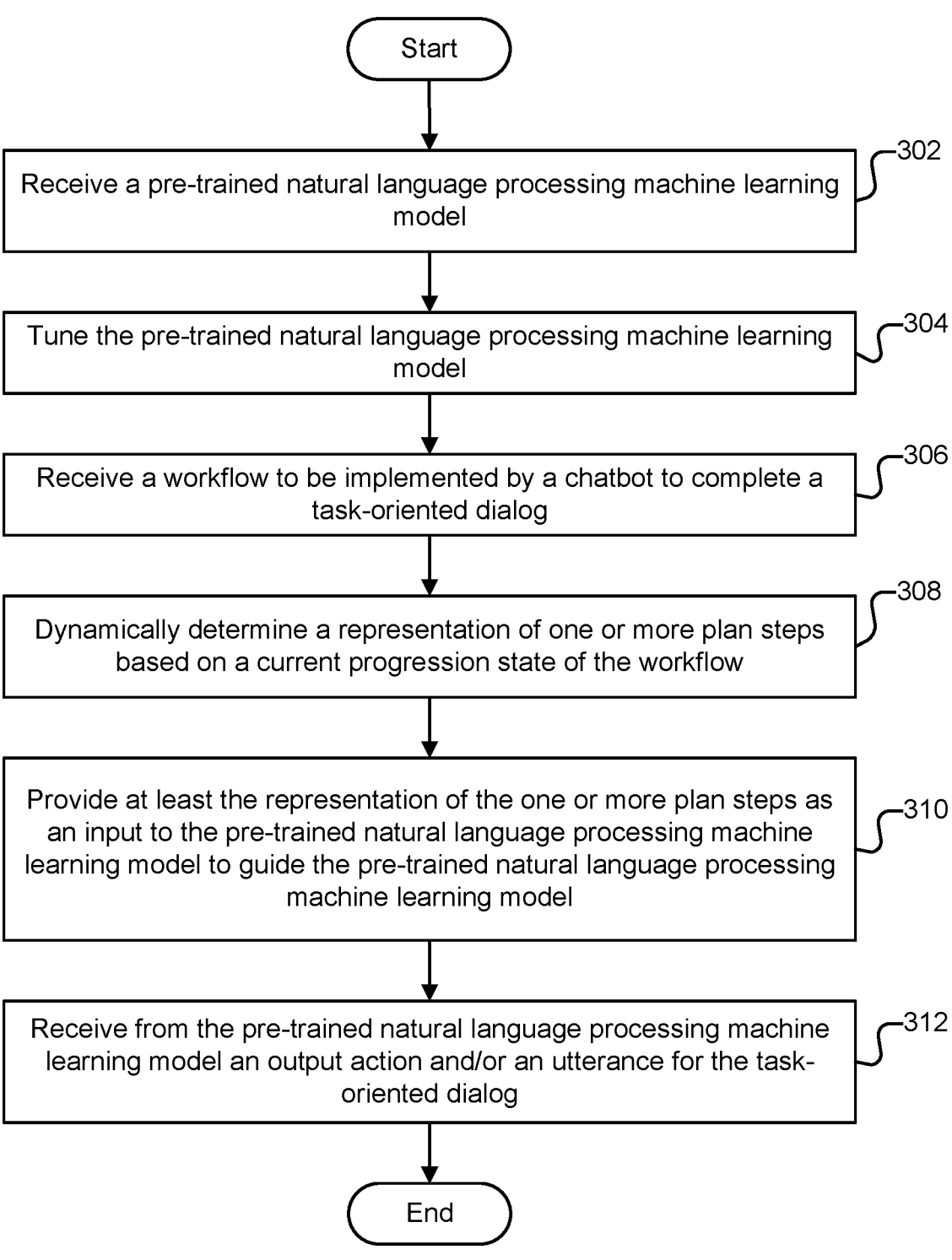
FIG. 3 is a flow diagram illustrating an embodiment of a process for handling a task-oriented dialog.

FIG. 3 is a flow diagram illustrating an embodiment of a process for handling a task-oriented dialog. In some embodiments, the process of FIG. 3 is performed by system 100 of FIG. 1.

At 302, a pre-trained natural language processing machine learning model is received. In some embodiments, the pre-trained natural language processing machine is machine learning model 107 of FIG. 1. In various embodiments, the pre-trained natural language processing machine has been pre-trained to convert input text to output text using a large language model training library.

At 304, the pre-trained natural language processing machine learning model is tuned. In some embodiments, tuning the pre-trained natural language processing machine includes further providing the pre-trained natural language machine learning model with action plans as training data. In a specific turn, an action plan refers to a sequence of remaining actions for a given workflow. A workflow (or flow) refers to a fixed process comprised of a sequence of actions required to perform the workflow (task) correctly. For example, a T5 text2text model may be tuned by providing the model with action plans comprised of actions to complete multi-step tasks (e.g., plan 206 of FIG. 2). Such plans augment dialogue training data to train the model to correctly complete workflows that are responsive to user intent.

At 306, a workflow to be implemented by a chatbot to complete a task-oriented dialog is received. In some embodiments, the workflow is detected automatically. For example, the workflow may be detected by the pre-trained natural language processing machine learning model or a separate machine learning model. The workflow may also be detected based at least in part on symbolic planning or other rules, e.g., business rules. In some embodiments, the workflow is selected from a list of known possible workflows (e.g., list of valid workflows 204 of FIG. 2).

At 308, a representation of one or more plan steps based on a current progression state of the workflow is dynamically determined. In various embodiments, these plan steps form an action plan comprised of actions necessary to complete the workflow. For example, in a workflow involving resolving a client's issues with logging into a computer system, it may be determined that to complete the workflow, the client's password needs to be reset. The one or more plan steps would then be the actions necessary to rest the password (e.g., pulling up an account, entering account details, and sending a change password link to the client). The representation may take various forms. For example, the representation can include natural language text. The representation may also have a specialized syntax (e.g., PDDL syntax).

At 310, at least the representation of the one or more plan steps is provided as an input to the pre-trained natural language processing machine learning model to guide the pre-trained natural language processing machine learning model. In various embodiments, the pre-trained natural language processing machine learning model acts on a turn-by-turn basis in a dialogue. Thus, the representation of the one or more plan steps can be utilized to guide the pre-trained natural language processing machine learning model to an appropriate utterance based on the current progression state of the workflow and the current utterance from a user.

At 312, an output action and/or an utterance for the task-oriented dialog is received from the pre-trained natural language processing machine learning model. In various embodiments, the pre-trained natural language processing machine learning model utilizes its inputs, including a current utterance from a user and the representation of the one or more plan steps (action plan) to predict an output utterance (corresponding to an action) more accurately than without the representation of the one or more plan steps.

Figure 4:
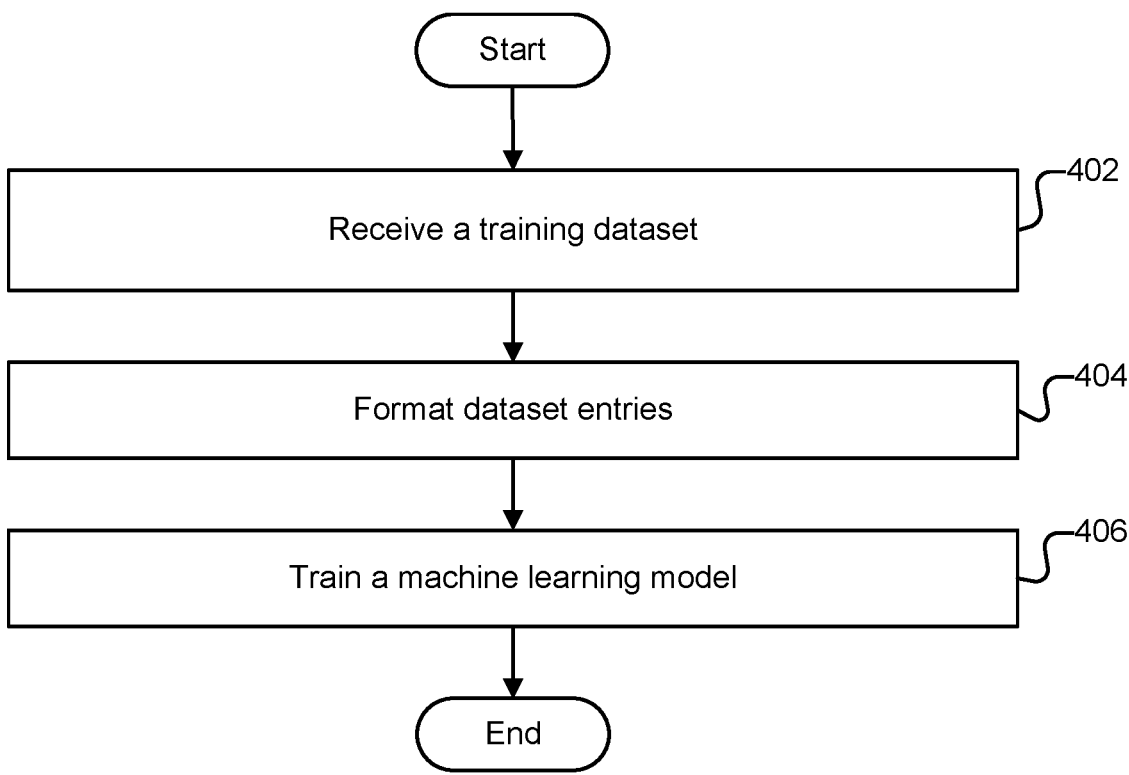
FIG. 4 is a flow diagram illustrating an embodiment of a process for training a machine learning model.

FIG. 4 is a flow diagram illustrating an embodiment of a process for training a machine learning model. In some embodiments, the machine learning model that is trained is machine learning model 107 of FIG. 1. In some embodiments, the training includes fine-tuning training for the machine learning model. In some embodiments, at least a portion of the process of FIG. 4 is performed at 304 of FIG. 3.

At 402, a training dataset is received. In some embodiments, the training dataset includes the ABCD dataset. ABCD dialogues center around the completion of workflows (goals) which are sequences of actions. Instructions for completing workflows (business logic) may be provided during dataset collection. These instructions can include "if-else" type logic, requiring the agent to adapt to the information provided by the user. ABCD includes 55 workflows (or goals), 30 unique actions (corresponding to API calls) with 231 unique slots, 12,000 unique slot values, and 22 turns per conversation. Another dataset that may be used is Multiwoz, which includes 7 actions, 24 unique slots, 4,500 unique slot values, and 13 turns per conversation. Slot values can be of two varieties: enumerable values (e.g., membership level can be one of "guest", "bronze", etc.) or non-enumerable (e.g., street_address can be a freeform string). ABCD provides two versions of the dialogues: the original, and the delexicalized versions. The actions in ABCD have optional arguments.

At 404, dataset entries are formatted. For the ABCD dataset, the agent wants to identify the tasks t among a finite set of legal tasks T $\{t^1, \ldots, t^M\}$. Each task $t^i$ is associated with a workflow $w_i = (a^1, \ldots, a_M, a)$ with $a^i \in A$. Once the agent narrows down the user's task, the agent completes the task if the complete set of workflow actions is executed in the correct order, with the correct arguments. Agent deviation from the workflow is tolerated but penalized during training. This problem can be formulated as an action theory $\Pi = (P, O)$, where P corresponds to slots being available, and dialogue actions in A are part of the operators O. Additional proposition actions are added to express that a task has been achieved, that slots are provided, and to control the order in which the actions should appear in the plan to achieve the task. In various embodiments, a STRIPS problem formulation is used.

At 406, the machine learning model is trained. In some embodiments, during training, teacher-forcing is used. This means that each turn in a conversation is treated as an independent training example, providing the correct context to the model (augmented as necessary) at each turn and ignoring the model's predictions for previous turns. Thus, errors made by the model are not propagated to future turns. This is important for training because: a) the customer utterances are static and will not adapt to "bad" agent utterances and b) it allows for efficient creation of batches of examples during training. In various embodiments, for every setup, a new model is trained, though it is also possible to perform multi-stage training or transfer learning.

Figure 5:
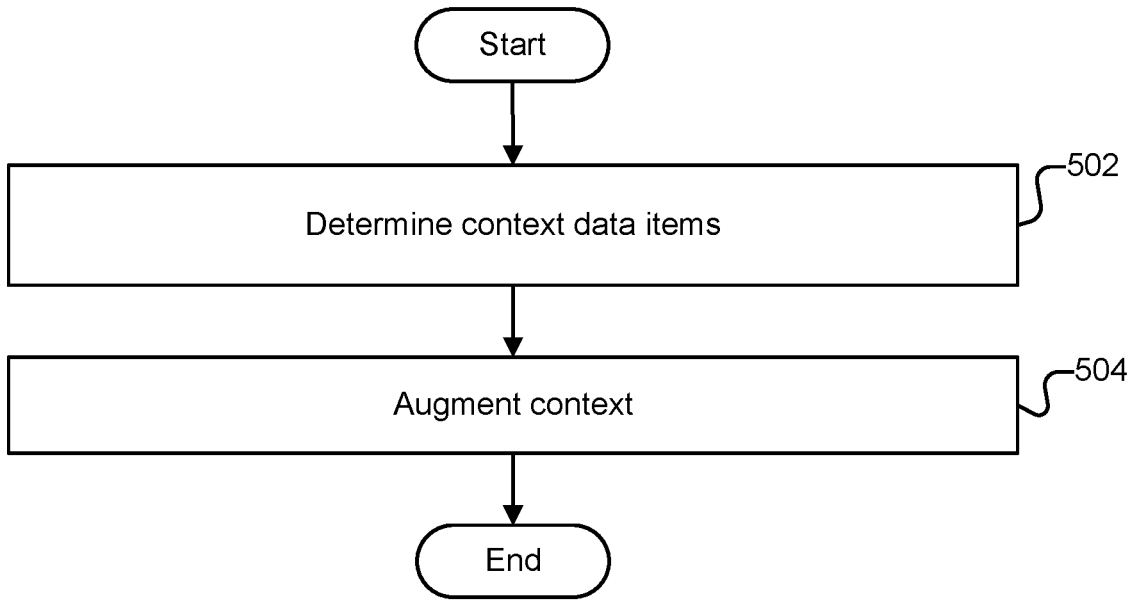
FIG. 5 is a flow diagram illustrating an embodiment of a process for generating a context to be provided to a machine learning model.

FIG. 5 is a flow diagram illustrating an embodiment of a process for generating a context to be provided to a machine learning model. In some embodiments, the machine learning model is machine learning model 107 of FIG. 1. In some embodiments, at least a portion of the process of FIG. 5 is performed at 310 of FIG. 3.

At 502, context data items are determined. In various embodiments, task-oriented dialogue is performed by reframing the task as a seq2seq (or text2text) prediction with a text-generation model. An encoder-decoder T5 model can be used. Any model which predicts an output string or given an input context string $c_t$ can also be used. The context string has the dialogue history, which is a concatenation of the string representations of all previous turns (utterances or actions) in the dialogue: $c_t = t_1, \ldots, t_T$. The following format can be used for each turn: <turn_type>: <utterance or action>. In some embodiments, actions can be inserted into the context in the following format: <action>: <slot_value_1>, <slot_value_2> . . . , which provides only the value of the slots, and not the slot names (e.g., phone number) or slot types (e.g., 10-digit numeric format). In some embodiments, the actions follow the format <action>: (<slot_name_1>:<slot_value_1>, <slot_name_2>: <slot_value_2>, . . . , which also provides the slot names along with the slot values. The slot values may be drawn directly from the text of the utterances or may be inferred from user utterances. In either case, a slot value may be adjusted to an equivalent canonical value. As a non-limiting example, a phone number of 555-123-4567 may be adjusted to 5551234567. In some embodiments, the basic output predicted by the machine learning model (action or utterance) is of the same format as the input.

At 504, the context is augmented. In various embodiments, the prompting context of the machine learning model is augmented with prompting information useful for guiding the model. Different types of prompting can be used, such as: 1) workflow names (F), 2) action-plans (P), i.e., the list of actions required to complete the workflow, and 3) longer lists of known or legal workflow names (L), or other information related to workflows and plans. In some embodiments, this prompting information can be encoded and provided to the machine learning model as follows: (1) for workflow names: flow: <workflow_name>; (2) for action-plans: flow: <workflow_name>; action_plan: <action_1>, <action_2>, . . . ; (3) for legal flow lists: legal_flows: <workflow_name>, . . . . This prompting information can be added: at the beginning or end of the dialogue context or between turns in the context. In the embodiments where slot types are used for adding actions and user utterances to the context, but there are multiple options for slot argument, then the prompting information for action plans can be flow: <workflow_name>; action_plan: <action_1>: (<slot_name_1_1>, Option: (<slot_name_1_2a>, <slot_name_1_2b> . . . ), . . . ), <action_2>: (<slot_name_2_1>, <slot_name_2_2>, Option: ( . . . ),), where the slot_names for each action might be optional for each action, and Option: (<slot_name_a>, <slot_ name_b>, . . . ) might mean that an action could accept as parameter one of those slot values. In the embodiments where slot types are used for adding actions and user utterances to the context, the prompting information for action plans can be flow: <workflow_name>; action_plan: <action_1>: (<slot_name_1_1>, <slot_name_1_2>, . . . ), <action_2>: (<slot_name_2_1>, <slot_name_2_2>, . . . ), where the slot_names for each action might be optional for each action. In some embodiments, when workflows could be completed in multiple ways, the action plan could represent a directed graph with multiple paths for achieving the goal, the workflow can be represented as a tree, and it is possible to use the characters '[' and ']' to express a sub-branch as following. For instance, flow: <workflow_name>; action_plan: <action_1>, <action_2>, branch A: [<action_3>, branch A1: [<action_4>, None]], branch B: [<action_5>] could indicate that after <action_2>, the workflow might proceed by doing <action_3> or <action_5>, and if the workflow continues in <action_3>, it could continue to <action_4> or terminate. An alternative representation of the same example would be to express explicit constraints ordering of actions of flow: <workflow_name>; action_plan: <action_1> BEFORE <action 2>, <action_2> BEFORE <action 3>, <action_2> BEFORE <action_5>, <action_3> BEFORE <action_4>. In some embodiments, when slot types are associated with actions, and workflows could be completed in multiple ways, then we can combine the representation of actions with slots and a directed graph with multiple paths, replacing <action_i> by <action_i>: (<slot_name_i_1>, . . . ). If options for slots are possible, we can combine the representations further by replacing <action_i> by <action_i>: (<slot_name_i_i>, Option: (<slot_name_i_2a>, <slot_name_i_2b> . . . ), . . . ).

Figure 6:
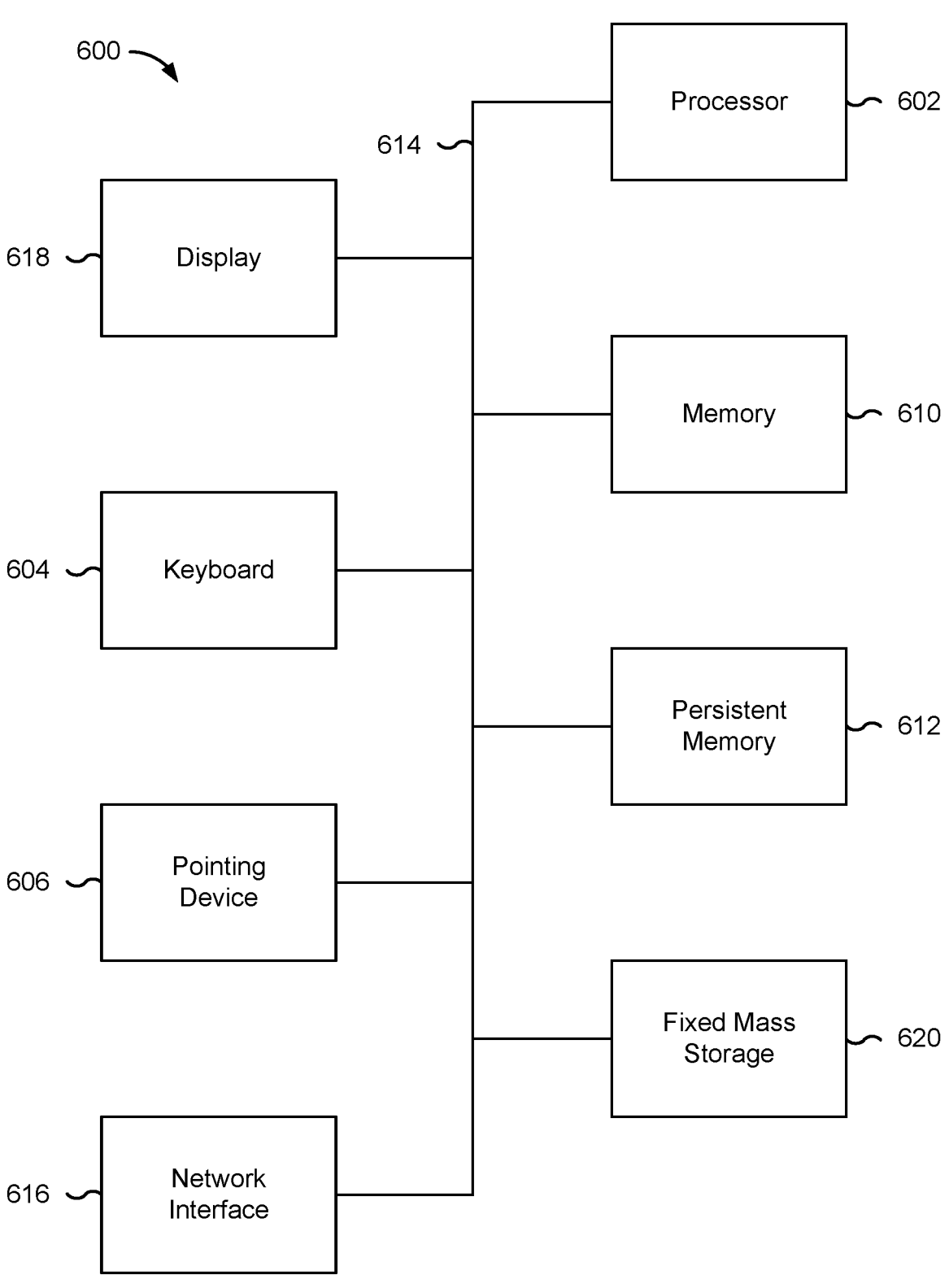
FIG. 6 is a functional diagram illustrating a programmed computer system.

FIG. 6 is a functional diagram illustrating a programmed computer system. In some embodiments, the processes of FIGS. 3, 4, and/or 5 are executed by computer system 600. Computer system 600 is an example of a processor. In some embodiments, computer system 600 is included in client 101 and/or server 104 of FIG. 1.

In the example shown, computer system 600 includes various subsystems as described below. Computer system 600 includes at least one microprocessor subsystem (also referred to as a processor or a central processing unit (CPU)) 602. Computer system 600 can be physical or virtual (e.g., a virtual machine). For example, processor 602 can be implemented by a single-chip processor or by multiple processors. In some embodiments, processor 602 is a general-purpose digital processor that controls the operation of computer system 600. Using instructions retrieved from memory 610, processor 602 controls the reception and manipulation of input data, and the output and display of data on output devices (e.g., display 618).

Processor 602 is coupled bi-directionally with memory 610, which can include a first primary storage, typically a random-access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 602. Also, as is well known in the art, primary storage typically includes basic operating instructions, program code, data, and objects used by the processor 602 to perform its functions (e.g., programmed instructions). For example, memory 610 can include any suitable computer-readable storage media, described below, depending on whether, for example, data access needs to be bi-directional or uni-directional. For example, processor 602 can also directly and very rapidly retrieve and store frequently needed data in a cache memory (not shown).

Persistent memory 612 (e.g., a removable mass storage device) provides additional data storage capacity for computer system 600, and is coupled either bi-directionally (read/write) or uni-directionally (read only) to processor 602. For example, persistent memory 612 can also include computer-readable media such as magnetic tape, flash memory, PC-CARDS, portable mass storage devices, holographic storage devices, and other storage devices. A fixed mass storage 620 can also, for example, provide additional data storage capacity. The most common example of fixed mass storage 620 is a hard disk drive. Persistent memory 612 and fixed mass storage 620 generally store additional programming instructions, data, and the like that typically are not in active use by the processor 602. It will be appreciated that the information retained within persistent memory 612 and fixed mass storages 620 can be incorporated, if needed, in standard fashion as part of memory 610 (e.g., RAM) as virtual memory.

In addition to providing processor 602 access to storage subsystems, bus 614 can also be used to provide access to other subsystems and devices. As shown, these can include a display monitor 618, a network interface 616, a keyboard 604, and a pointing device 606, as well as an auxiliary input/output device interface, a sound card, speakers, and other subsystems as needed. For example, pointing device 606 can be a mouse, stylus, track ball, or tablet, and is useful for interacting with a graphical user interface.

Network interface 616 allows processor 602 to be coupled to another computer, computer network, or telecommunications network using a network connection as shown. For example, through network interface 616, processor 602 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 602 can be used to connect computer system 600 to an external network and transfer data according to standard protocols. Processes can be executed on processor 602, or can be performed across a network such as the Internet, intranet networks, or local area networks, in conjunction with a remote processor that shares a portion of the processing. Additional mass storage devices (not shown) can also be connected to processor 602 through network interface 616.

An auxiliary I/O device interface (not shown) can be used in conjunction with computer system 600. The auxiliary I/O device interface can include general and customized interfaces that allow processor 602 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 6 is but an example of a computer system suitable for use with the various embodiments disclosed herein. Other computer systems suitable for such use can include additional or fewer subsystems. In addition, bus 614 is illustrative of any interconnection scheme serving to link the subsystems. Other computer architectures having different configurations of subsystems can also be utilized.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   receiving a pre-trained natural language processing machine learning model;
   tuning the pre-trained natural language processing machine learning model,
   wherein tuning the pre-trained natural language processing machine learning model includes further training the pre-trained natural language processing machine learning model using action plans comprised of actions to complete multi-step tasks;
   receiving workflow data indicating a workflow associated with performing a task,
   wherein the workflow comprises a sequence of application programming interface calls;
   determining a representation of one or more plan steps to complete the workflow based on a current progression state of the workflow, the representation generated by a symbolic planner external to the pre-trained natural language processing machine learning model;
   providing additional input data to the pre-trained natural language processing machine learning model including at least a concatenation of string representations of turns in a dialog history and the representation of the one or more plan steps to complete the workflow for a dialog with a chatbot,
   wherein the representation of the one or more plan steps to complete the workflow comprises a tree with each branch corresponding to a path to achieve a goal of the workflow; and
   determining, via the pre-trained natural language processing machine learning model, an output action or an utterance associated with the dialog.

2. The method of claim 1, wherein the pre-trained natural language processing machine learning model is configured to receive text data and output text data.

3. The method of claim 1, wherein the pre-trained natural language processing machine learning model includes an encoder-decoder structure.

4. The method of claim 1, wherein the workflow includes a sequence of actions required to perform the task correctly.

5. The method of claim 1, wherein the chatbot is configured to transmit user utterances to the pre-trained natural language processing machine learning model.

6. The method of claim 1, wherein the chatbot is configured to transmit the output action or the utterance from the pre-trained natural language processing machine learning model to a dialog partner of the chatbot.

7. The method of claim 1, wherein the representation of the one or more plan steps includes natural language text describing specified actions.

8. The method of claim 1, wherein the representation of the one or more plan steps includes text generated using a specified syntax.

9. The method of claim 8, wherein the specified syntax is associated with a Planning Domain Definition Language.

10. The method of claim 1, wherein the workflow is selected from a list of valid workflows.

11. The method of claim 1, wherein the task is an information technology task.

12. The method of claim 1, wherein the pre-trained natural language processing machine learning model has been trained on data that includes an action-based conversations dataset.

13. The method of claim 1, wherein completing the dialog has been formulated as an automated planner problem.

14. A system, comprising:

one or more processors configured to:

receive a pre-trained natural language processing machine learning model;

tuning the pre-trained natural language processing machine learning model, wherein tuning the pre-trained natural language processing machine learning model includes further training the pre-trained natural language processing machine learning model using action plans comprised of actions to complete multi-step tasks;

receive workflow data indicating a workflow associated with performing a task, wherein the workflow comprises a sequence of application programming interface calls;

determine a representation of one or more plan steps to complete the workflow based on a current progression state of the workflow, the representation generated by a symbolic planner external to the pre-trained natural language processing machine learning model;

provide additional input data to the pre-trained natural language processing machine learning model including at least a concatenation of string representations of turns in a dialog history and the representation of the one or more plan steps to complete the workflow for a dialog with a chatbot, wherein the representation of the one or more plan steps to complete the workflow comprises a tree with each branch corresponding to a path to achieve a goal of the workflow; and determine, via the pre-trained natural language processing machine learning model, an output action or an utterance associated with the dialog; and a memory coupled to at least one of the one or more processors and configured to provide at least one of the one or more processors with instructions.

15. A computer program product embodied in a non-transitory computer readable medium and comprising computer instructions for:

receiving a pre-trained natural language processing machine learning model;

tuning the pre-trained natural language processing machine learning model, wherein tuning the pre-trained natural language processing machine learning model includes further training the pre-trained natural language processing machine learning model using action plans comprised of actions to complete multi-step tasks;

receiving workflow data indicating a workflow associated with performing a task, wherein the workflow comprises a sequence of application programming interface calls;

determining a representation of one or more plan steps to complete the workflow based on a current progression state of the workflow, the representation generated by a symbolic planner external to the pre-trained natural language processing machine learning model;

providing additional input data to the pre-trained natural language processing machine learning model including at least a concatenation of string representations of turns in a dialog history and the representation of the one or more plan steps to complete the workflow for a dialog with a chatbot, wherein the representation of the one or more plan steps to complete the workflow comprises a tree with each branch corresponding to a path to achieve a goal of the workflow; and determining, via the pre-trained natural language processing machine learning model, an output action or an utterance associated with the dialog.

16. The method of claim 1, wherein the current progression state of the workflow is based on a current state of a system.

17. The system of claim 14, wherein the workflow is selected from a list of valid workflows.

18. The system of claim 14, wherein the current progression state of the workflow is based on a current state of a system.

19. The computer program product of claim 15, wherein the workflow is selected from a list of valid workflows.

20. The computer program product of claim 15, wherein the current progression state of the workflow is based on a current state of a system.

* * * * *